United States Patent
Niu et al.

(10) Patent No.: US 9,480,021 B2
(45) Date of Patent: Oct. 25, 2016

(54) TERMINAL AND ADJUSTMENT METHOD FOR OPERATING STATE OF TERMINAL

(75) Inventors: Yihua Niu, Guangdong (CN); Bijun Zhang, Guangdong (CN); Chunsong Feng, Guangdong (CN)

(73) Assignees: YULONG COMPUTER TELECOMMUNICATION SCIENTIFIC (SHENZHEN) CO., LTD., Shenzhen, Guangdong (CN); DONGGUAN YULONG TELECOMMUNICATION TECH CO., LTD., Dongguan, Guangdong (CN)

( * ) Notice: Subject to any disclaimer, the term of this patent is extended or adjusted under 35 U.S.C. 154(b) by 0 days.

(21) Appl. No.: 14/424,564

(22) PCT Filed: Aug. 29, 2012

(86) PCT No.: PCT/CN2012/080721
§ 371 (c)(1),
(2), (4) Date: Feb. 27, 2015

(87) PCT Pub. No.: WO2014/032240
PCT Pub. Date: Mar. 6, 2014

(65) Prior Publication Data
US 2015/0208356 A1 Jul. 23, 2015

(51) Int. Cl.
*H04B 1/38* (2015.01)
*H04W 52/02* (2009.01)

(52) U.S. Cl.
CPC ....... *H04W 52/0261* (2013.01); *H04W 52/028* (2013.01); *H04W 52/0277* (2013.01)

(58) Field of Classification Search
CPC ......... H04W 52/0261; H04W 52/028; H04W 52/0287; H04W 52/0277; H04M 1/73
See application file for complete search history.

(56) References Cited

U.S. PATENT DOCUMENTS

2012/0108224 A1* 5/2012 Cheng ............... H04W 52/0277
455/418
2012/0165963 A1* 6/2012 Kim ........................ G06F 1/266
700/22

(Continued)

FOREIGN PATENT DOCUMENTS

| CN | 101222713 A | 7/2008 |
| CN | 101873385 A | 10/2010 |
| CN | 202135331 U | 2/2012 |

OTHER PUBLICATIONS

International Search Report dated Jun. 6, 2013 issued in International Application No. PCT/CN2012/080721.

*Primary Examiner* — Ping Hsieh
(74) *Attorney, Agent, or Firm* — Scully, Scott, Murphy & Presser, P.C.

(57) ABSTRACT

A terminal comprises: an electric quantity acquisition unit for acquiring the real-time electric quantity of a battery of the terminal; an electric quantity judgment unit for judging whether the real-time electric quantity of the battery is lower than a preset electric quantity value; and a state adjustment unit for adjusting the state of a working component in the terminal in the case that the judgment result of the electric quantity judgment unit is yes. The working state of the terminal may be adjusted according to the real-time electric quantity of the battery of the terminal, the problem that the battery output voltage of the terminal suddenly decreases below the safe working voltage of hardware thereof is solved, the operating stability of the terminal is ensured while taking the performance of the terminal into account.

13 Claims, 3 Drawing Sheets

(56) References Cited

U.S. PATENT DOCUMENTS

| | | | |
|---|---|---|---|
| 2012/0191994 A1* | 7/2012 | Sun | H04W 52/0261 713/320 |
| 2012/0198207 A1* | 8/2012 | George | G06F 1/3206 712/36 |
| 2012/0295672 A1* | 11/2012 | Kim | H04M 1/2745 455/573 |
| 2013/0002629 A1* | 1/2013 | Cong | H04W 52/028 345/211 |

* cited by examiner

TERMINAL AND ADJUSTMENT METHOD FOR OPERATING STATE OF TERMINAL

FIELD OF THE INVENTION

The present invention relates to the technical field of mobile communications, and particularly relates to a terminal and an adjustment method for the working state of the terminal.

BACKGROUND OF THE INVENTION

In the development of current mobile communication technology, the power consumption problem of mobile phones is increasingly serious with the use and popularization of multi-core CPU such as 2-core or 4-core CPU (namely Central Processing Unit, which is a core component of a mobile phone), high-performance GPU (namely Graphic Processing Unit, which is a hardware graphic acceleration chip of a mobile phone) and LTE (namely Long Term Evolution, which is a transition technology between 3G and 4G technologies) communication modules. Under the condition of multi-service concurrence, a plurality of modules of a mobile phone may simultaneously run at full speed, so that the instantaneous power consumption of the mobile phone is huge; since a battery of the mobile phone has internal resistance, the battery itself consumes certain voltage under instantaneous heavy current, and then the voltage output by the battery is quickly pulled down; and when the voltage of the battery is pulled down below the safe working voltage of key hardware such as a CPU or a power manager, the phenomena of restart, crash and the like due to abnormal power-down appear to the mobile phone, so that the user experience is seriously influenced.

In the schemes of the prior art, start of a multi-core CPU and adjustment of a working frequency are automatically performed along with the busy degree of the current system. However, the current electric quantity of a battery of the mobile phone is not considered in the working state adjustment of the CPU in the existing scheme, and the CPU is allowed to work at full speed as long as being in a power-on state. Under some probable conditions, e.g. when the multi-core CPU simultaneously works at the highest frequency, the LET module performs a service of large data volume and the GPU also runs at full speed, the peak of current consumed by the mobile phone may reach 2 A and even higher, and when the battery voltage of the mobile phone is relatively low, such heavy current enables the battery voltage to suddenly decrease below the safe working voltage of hardware, so that negative effects of abnormal restart, crash and the like are caused, and the user experience is seriously influenced.

Accordingly, a new terminal working state adjusting technology is needed, so that the working state of the terminal may be adjusted according to the real-time electric quantity of the battery of the terminal, the problem that the battery output voltage of the terminal suddenly decreases below the safe working voltage of hardware thereof due to instantaneous heavy current in the circuit of the terminal in the case that the electric quantity of the battery is relatively low is solved, the operating stability of the terminal is ensured while taking the performance of the terminal into account, and the user experience is improved.

SUMMARY OF THE INVENTION

Based on the above problems, the present invention provides a new terminal working state adjusting technology, so that the working state of a terminal may be adjusted according to the real-time electric quantity of a battery of the terminal, the problem that the battery output voltage of the terminal suddenly decreases below the safe working voltage of hardware thereof due to instantaneous heavy current in the circuit of the terminal in the case that the electric quantity of the battery is relatively low is solved, the operating stability of the terminal is ensured while taking the performance of the terminal into account, and the user experience is improved.

For this purpose, the present invention provides a terminal, including: an electric quantity acquisition unit for acquiring the real-time electric quantity of a battery of the terminal; an electric quantity judgment unit for judging whether the real-time electric quantity of the battery is lower than a preset electric quantity value; and a state adjustment unit for adjusting the state of a working component in the terminal in the case that the judgment result of the electric quantity judgment unit is yes to limit the power consumption of the working component.

In this technical solution, the preset electric quantity value may be a pre-calculated minimum electric quantity value which needs to be maintained by the battery of the terminal when all working components in the terminal simultaneously work at full load, of course, may also be set by a user or a manufacturer according to actual conditions or needs. This electric quantity value may be calculated according to the minimum safe working voltage of each working component of the terminal, the maximum value of current consumed when all the working components of the terminal simultaneously work at full load and the internal resistance value of the battery of the terminal. When the real-time electric quantity of the battery of the terminal is smaller than the preset electric quantity value, it indicates that the battery of the terminal may not support all the working components in the terminal to simultaneously work at full load, and then state adjustment is needed for the working components in the terminal to limit the power consumption of these working components, so as to ensure that the voltage provided by the battery of the terminal meets the requirement of the working components at work in the terminal for safe working all the time and then prevent the phenomena of restart, crash and the like of the terminal due to abnormal power-down when the battery voltage is lower than the safe working voltage of a certain working component at work.

In the above technical solution, preferably, the terminal further includes: an interval judgment unit for judging a preset electric quantity interval of the real-time electric quantity of the battery in the case that the judgment result of the electric quantity judgment unit is yes, so that the state adjustment unit may select a corresponding state adjustment scheme to adjust the state of the working component.

In this technical solution, the power consumption of each working component in the terminal during working is different, the power consumption of a single working component in different working states is also different, thus, the electric quantity of the battery of the terminal may be respectively calculated in advance for various conditions that different working components simultaneously work, and then different terminal state adjustment schemes are designed for these different conditions, so that the working performance of the terminal is taken into account while the working stability of the terminal is ensured, and when the electric quantity of the battery of the terminal is in any preset electric quantity interval, the electric quantity of the battery may be fully utilized, abnormal power-down is avoided, and the user experience is improved.

In the above technical solution, preferably, each state adjustment scheme selected by the state adjustment unit includes at least one of or a combination of the following items: adjusting the working frequency of a central processing unit (CPU) and/or the variation amplitude of the working frequency; if the CPU is a multi-core CPU, disabling at least one CPU core in the multi-core CPU according to a preset rule; adjusting the working frequency of each CPU core in the CPU and/or the variation amplitude of the working frequency; adjusting the working frequency of a graphic processing unit (GPU) in the terminal and/or disabling a 3D hardware acceleration function; and limiting the data traffic of a communication module in the terminal within a preset range.

In the terminal, the CPU is a core component, and is also one of main power consumption components in the terminal. When the CPU works at high frequency or the working frequency of the CPU is greatly increased within short time, instantaneous heavy current may be generated in the terminal to cause abnormal power-down of the terminal. Therefore, in this technical solution, when the electric quantity of the battery of the terminal is low or at a specific electric quantity interval, the working frequency of the CPU of the terminal may be adjusted, so that the CPU works below certain working frequency, and/or the amplitude of the working frequency increased every time is controlled within a certain range. In the case that the CPU is a multi-core CPU, when a plurality of CPU cores simultaneously work, instantaneous heavy current is always generated in the terminal, so in this technical solution, when the electric quantity of the battery of the terminal is low or at a specific electric quantity interval, at least one CPU core in the multi-core CPU may be disabled according to a predetermined rule (e.g. each CPU core in the multi-core CPU is numbered, then when the electric quantity of the battery of the terminal is at a certain electric quantity interval, the CPU core of the minimum number is disabled, and when the electric quantity of the battery of the terminal is further reduced, the CPU core of the minimum number in the working CPU cores is disabled according to the number sequence, and so on), or the working frequency of each CPU core in the CPU is adjusted, so that each CPU core works below certain working frequency, and/or the amplitude of the working frequency, increased every time, of each CPU core is controlled within a certain range, so as to reduce the power consumption of the multi-core CPU and avoid generating the instantaneous heavy current in the terminal. When the GPU in the terminal works at high frequency and the 3D hardware acceleration function is enabled, instantaneous heavy current may be generated in the terminal, so in this technical solution, when the electric quantity of the battery of the terminal is low or at a specific electric quantity interval, the working frequency of the GPU in the terminal may be adjusted, so that the GPU works below certain working frequency, and/or the 3D hardware acceleration function of the GPU is disabled, so as to reduce the power consumption of the GPU and avoid generating the instantaneous heavy current in the terminal.

After the data traffic of the service performed by the communication module in the terminal reaches a certain degree, instantaneous heavy current may also be generated in the terminal, so in this technical solution, when the electric quantity of the battery of the terminal is low or at a specific electric quantity interval, the data traffic of the communication module in the terminal is limited within a preset range. Taking the LTE module as an example, services capable of being performed by the LTE module may be previously sequenced according to the magnitude of the data traffic; when the electric quantity of the battery of the terminal is low or at a certain electric quantity interval, the LTE module is forbidden to perform the service with maximum data traffic; and when the electric quantity of the battery of the terminal is further reduced, the LTE module is further forbidden to perform the current permissible service with maximum data traffic, and so on, so as to reduce the power consumption of the LTE module and avoid generating the instantaneous heavy current in the terminal. Or, for each communication module in the terminal, a data traffic threshold corresponding to each preset electric quantity interval is preset, and the corresponding data traffic threshold is selected according to the preset electric quantity interval of the real-time electric quantity of the battery, so that the services lower than the data traffic threshold are permitted, and the services greater than or equal to the data traffic threshold are disabled or in a waiting queue.

In the above technical solution, preferably, the terminal further includes a setting unit for performing association setting on at least one state adjustment scheme and at least one preset electric quantity interval according to a received setting command.

In this technical solution, different preset electric quantity intervals in which the electric quantity of the battery of the terminal may meet requirements may be previously and respectively calculated for various conditions that different working components in the terminal simultaneously work, and then different terminal state adjustment schemes are designed for these different conditions. These terminal state adjustment schemes may be previously associated with the different preset electric quantity intervals by default, and the different terminal state adjustment schemes may also be associated with the different preset electric quantity intervals by users according to their operating habits to meet different requirements of different users.

In the above technical solution, preferably, the preset electric quantity value and the preset electric quantity interval are calculated according to the minimum safe working voltage value of each working component, the consumed current value and the resistance value of the battery in the terminal. Wherein, "the consumed current value" indicates the corresponding consumed current value in the case that the working component is normal or in the case that the state adjustment scheme is adopted for adjusting when the corresponding state adjustment scheme exists.

In the above technical solution, preferably, the working components include the CPU, the GPU and/or the communication module in the terminal.

It could be known by calculating and analyzing that the CPU, the GPU and the communication module consume relatively high power in the current working components of the terminal. Therefore, in this technical solution, a specific state adjustment scheme may be made for one or more of the three working components, to reduce the power consumption thereof and ensure the working performance and stability of the terminal. Of course, those skilled in the art could understand that, obviously, the working states of other components in the terminal may also be randomly adjusted by adopting the technical solutions of the present application.

In the above technical solution, preferably, the terminal further includes a terminal state detection unit for detecting whether the terminal is in a charged state and a running state control unit for enabling the terminal to run in a specific state in the case that the terminal is in the charged state.

In this technical solution, when the terminal is in the charged state, no matter in which electric quantity interval the electric quantity of the battery of the terminal is, the practical working voltage of each working component in the terminal is prevented from being lower than the safe working voltage due to the instantaneous heavy current in the circuit, so under such a condition, each working component of the terminal may be in any working state meeting the performance requirement of the terminal. The specific state may be a terminal working state selected by a user in a certain terminal state adjustment scheme, or a working state of the terminal before charging, or a state of the terminal when the electric quantity of the battery is not lower than the preset electric quantity value.

The present invention further provides an adjustment method for the working state of a terminal, including: step 202, acquiring the real-time electric quantity of a battery of the terminal; and step 204, adjusting the state of a working component in the terminal when the real-time electric quantity of the battery is lower than a preset electric quantity value to limit the power consumption of the working component.

In this technical solution, the preset electric quantity value may be a pre-calculated minimum electric quantity value which needs to be maintained by the battery of the terminal when all working components in the terminal simultaneously work at full load, of course, may also be set by a user or a manufacturer according to actual conditions or needs. This electric quantity value may be calculated according to the minimum safe working voltage of each working component of the terminal, the maximum value of current consumed when all the working components of the terminal simultaneously work at full load and the internal resistance value of the battery of the terminal. When the real-time electric quantity of the battery of the terminal is smaller than the preset electric quantity value, it indicates that the battery of the terminal may not support all the working components in the terminal to simultaneously work at full load, and then state adjustment is needed for the working components in the terminal to limit the power consumption of these working components, so as to ensure that the voltage provided by the battery of the terminal meets the requirement of the working components at work in the terminal for safe working all the time and then prevent the phenomena of restart, crash and the like of the terminal due to abnormal power-down when the battery voltage is lower than the safe working voltage of a certain working component at work.

In the above technical solution, preferably, step 204 further includes: selecting a corresponding state adjustment scheme to adjust the state of the working component according to a preset electric quantity interval of the real-time electric quantity of the battery.

In this technical solution, the power consumption of each working component in the terminal during working is different, the power consumption of a single working component in different working states is also different, thus, the electric quantity of the battery of the terminal may be respectively calculated in advance for various conditions that different working components simultaneously work, and then different terminal state adjustment schemes are designed for these different conditions, so that the working performance of the terminal is taken into account while the working stability of the terminal is ensured, and when the electric quantity of the battery of the terminal is in any preset electric quantity interval, the electric quantity of the battery may be fully utilized, abnormal power-down is avoided, and the user experience is improved.

In the above technical solution, preferably, each state adjustment scheme includes at least one of or a combination of the following items: adjusting the working frequency of a central processing unit (CPU) and/or the variation amplitude of the working frequency; if the CPU is a multi-core CPU, disabling at least one CPU core in the multi-core CPU according to a preset rule; adjusting the working frequency of a graphic processing unit (GPU) in the terminal and/or disabling a 3D hardware acceleration function; adjusting the working frequency of each CPU core in the CPU and/or the variation amplitude of the working frequency; and limiting the data traffic of a communication module in the terminal within a preset range.

In the terminal, the CPU is a core component, and is also one of main power consumption components in the terminal. When the CPU works at high frequency or the working frequency of the CPU is greatly increased within short time, instantaneous heavy current may be generated in the terminal to cause abnormal power-down of the terminal. Therefore, in this technical solution, when the electric quantity of the battery of the terminal is low or at a specific electric quantity interval, the working frequency of the CPU of the terminal may be adjusted, so that the CPU works below certain working frequency, and/or the amplitude of the working frequency increased every time is controlled within a certain range. In the case that the CPU is a multi-core CPU, when a plurality of CPU cores simultaneously work, instantaneous heavy current is always generated in the terminal, so in this technical solution, when the electric quantity of the battery of the terminal is low or at a specific electric quantity interval, at least one CPU core in the multi-core CPU may be disabled according to a predetermined rule (e.g. each CPU core in the multi-core CPU is numbered, then when the electric quantity of the battery of the terminal is at a certain electric quantity interval, the CPU core of the minimum number is disabled, and when the electric quantity of the battery of the terminal is further reduced, the CPU core of the minimum number in the working CPU cores is disabled according to the number sequence, and so on), or the working frequency of each CPU core in the CPU is adjusted, so that each CPU core works below certain working frequency, and/or the amplitude of the working frequency, increased every time, of each CPU core is controlled within a certain range, so as to reduce the power consumption of the multi-core CPU and avoid generating the instantaneous heavy current in the terminal.

When the GPU in the terminal works at high frequency and the 3D hardware acceleration function is enabled, instantaneous heavy current may be generated in the terminal, so in this technical solution, when the electric quantity of the battery of the terminal is low or at a specific electric quantity interval, the working frequency of the GPU in the terminal may be adjusted, so that the GPU works below certain working frequency, and/or the 3D hardware acceleration function of the GPU is disabled, so as to reduce the power consumption of the GPU and avoid generating the instantaneous heavy current in the terminal.

After the data traffic of the service performed by the communication module in the terminal reaches a certain degree, instantaneous heavy current may also be generated in the terminal, so in this technical solution, when the electric quantity of the battery of the terminal is low or at a specific electric quantity interval, the data traffic of the communication module in the terminal is limited within a preset range. Taking the LTE module as an example, services capable of being performed by the LTE module may be previously sequenced according to the magnitude of the data traffic; when the electric quantity of the battery of the terminal is low or at a certain electric quantity interval, the LTE module is forbidden to perform the service with maximum data traffic; and when the electric quantity of the battery of the terminal is further reduced, the LTE module is further forbidden to perform the current permissible service with maximum data traffic, and so on, so as to reduce the power consumption of the LTE module and avoid generating the instantaneous heavy current in the terminal. Or, for each communication module in the terminal, a data traffic threshold corresponding to each preset electric quantity interval is preset, and the corresponding data traffic threshold is selected according to the preset electric quantity interval of the real-time electric quantity of the battery, so that the services lower than the data traffic threshold are permitted, and the services greater than or equal to the data traffic threshold are disabled or in a waiting queue.

In the above technical solution, preferably, before step 204, the adjustment method further includes: performing association setting on at least one state adjustment scheme and at least one preset electric quantity interval according to a received setting command.

In this technical solution, different preset electric quantity intervals in which the electric quantity of the battery of the terminal may meet requirements may be previously and respectively calculated for various conditions that different working components in the terminal simultaneously work, and then different terminal state adjustment schemes are designed for these different conditions. These terminal state adjustment schemes may be previously associated with the different preset electric quantity intervals by default, and the different terminal state adjustment schemes may also be associated with the different preset electric quantity intervals by users according to their operating habits to meet different requirements of different users.

In the above technical solution, preferably, in step 204, the preset electric quantity value and the preset electric quantity interval are calculated according to the minimum safe working voltage value of each working component, the consumed current value and the resistance value of the battery in the terminal. Wherein, "the consumed current value" indicates the corresponding consumed current value in the case that the working component is normal or in the case that the state adjustment scheme is adopted for adjusting when the corresponding state adjustment scheme exists.

In the above technical solution, preferably, the working components include the CPU, the GPU and/or the communication module in the terminal.

It could be known by calculating and analyzing that the CPU, the GPU and the communication module consume relatively high power in the current working components of the terminal. Therefore, in this technical solution, a specific state adjustment scheme may be made for one or more of the three working components, to reduce the power consumption thereof and ensure the working performance and stability of the terminal. Of course, those skilled in the art could understand that, obviously, the working states of other components in the terminal may also be randomly adjusted by adopting the technical solutions of the present application.

In the above technical solution, preferably, step 204 further includes: enabling the terminal to run in a specific state if the terminal is in a charged state.

In this technical solution, when the terminal is in the charged state, no matter in which electric quantity interval the electric quantity of the battery of the terminal is, the practical working voltage of each working component in the terminal is prevented from being lower than the safe working voltage due to the instantaneous heavy current in the circuit, so under such a condition, each working component of the terminal may be in any working state meeting the performance requirement of the terminal. The specific state may be a terminal working state selected by a user in a certain terminal state adjustment scheme, or a working state of the terminal before charging, or a state of the terminal when the electric quantity of the battery is not lower than the preset electric quantity value.

Through the above technical solutions, the working state of the terminal may be adjusted according to the real-time electric quantity of the battery of the terminal, so that the problem that the battery output voltage of the terminal suddenly decreases below the safe working voltage of hardware thereof due to instantaneous heavy current in the circuit of the terminal in the case that the electric quantity of the battery is relatively low is solved, the operating stability of the terminal is ensured while taking the performance of the terminal into account, and the user experience is improved.

DETAILED DESCRIPTION OF THE EMBODIMENTS

To understand the above purposes, features and advantages of the present invention more clearly, the present invention will be further described in detail below in combination with the accompanying drawings and specific implementations. It should be noted that, the embodiments of the present application and the features in the embodiments may be combined with one another without conflicts.

Many specific details are described below to facilitate full understanding of the present invention. However, the present invention may also be implemented by adopting other manners different from those described herein. Accordingly, the protection scope of the present invention is not limited to the specific embodiments disclosed below.

Figure 1:
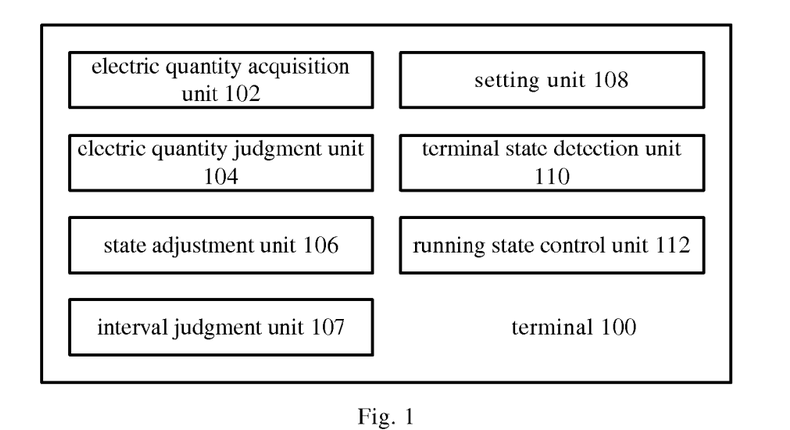
FIG. 1 shows a block diagram of a terminal according to an embodiment of the present invention.

FIG. 1 shows a block diagram of a terminal according to an embodiment of the present invention.

As shown in FIG. 1, the terminal 100 according to the embodiment of the present invention includes: an electric quantity acquisition unit 102 for acquiring the real-time electric quantity of a battery of the terminal 100; an electric quantity judgment unit 104 for judging whether the real-time electric quantity of the battery is lower than a preset electric quantity value; and a state adjustment unit 106 for adjusting the state of a working component in the terminal 100 in the case that the judgment result of the electric quantity judgment unit 104 is yes to limit the power consumption of the working component.

In this technical solution, the preset electric quantity value may be a pre-calculated minimum electric quantity value which needs to be maintained by the battery of the terminal 100 when all working components in the terminal 100 simultaneously work at full load, of course, may also be set by a user or a manufacturer according to actual conditions or needs. This electric quantity value may be calculated according to the minimum safe working voltage of each working component of the terminal 100, the maximum value of current consumed when all the working components of the terminal 100 simultaneously work at full load and the internal resistance value of the battery of the terminal 100. When the real-time electric quantity of the battery of the terminal 100 is smaller than the preset electric quantity value, it indicates that the battery of the terminal 100 may not support all the working components in the terminal 100 to simultaneously work at full load, and then state adjustment is needed for the working components in the terminal 100 to limit the power consumption of these working components, so as to ensure that the voltage provided by the battery of the terminal 100 meets the requirement of the working components at work in the terminal 100 for safe working all the time and then prevent the phenomena of restart, crash and the like of the terminal 100 due to abnormal power-down when the battery voltage is lower than the safe working voltage of a certain working component at work.

In the above technical solution, preferably, the terminal further includes: an interval judgment unit 107 for judging a preset electric quantity interval of the real-time electric quantity of the battery in the case that the judgment result of the electric quantity judgment unit 104 is yes, so that the state adjustment unit 106 may select a corresponding state adjustment scheme to adjust the state of the working component. In this technical solution, the power consumption of each working component in the terminal 100 during working is different, the power consumption of a single working component in different working states is also different, thus, the electric quantity of the battery of the terminal 100 may be respectively calculated in advance for various conditions that different working components simultaneously work, and then different terminal state adjustment schemes are designed for these different conditions, so that the working performance of the terminal 100 is taken into account while the working stability of the terminal 100 is ensured, and when the electric quantity of the battery of the terminal 100 is in any preset electric quantity interval, the electric quantity of the battery may be fully utilized, abnormal power-down is avoided, and the user experience is improved.

In the above technical solution, preferably, each state adjustment scheme selected by the state adjustment unit 106 includes at least one of or a combination of the following items: adjusting the working frequency of a central processing unit (CPU) and/or the variation amplitude of the working frequency; if the CPU is a multi-core CPU, disabling at least one CPU core in the multi-core CPU according to a preset rule; adjusting the working frequency of each CPU core in the CPU and/or the variation amplitude of the working frequency; adjusting the working frequency of a graphic processing unit (GPU) in the terminal 100 and/or disabling a 3D hardware acceleration function; and limiting the data traffic of a communication module in the terminal 100 within a preset range.

In the terminal 100, the CPU is a core component, and is also one of main power consumption components in the terminal 100. When the CPU works at high frequency or the working frequency of the CPU is greatly increased within short time, instantaneous heavy current may be generated in the terminal 100 to cause abnormal power-down of the terminal 100. Therefore, in this technical solution, when the electric quantity of the battery of the terminal 100 is low or at a specific electric quantity interval, the working frequency of the CPU of the terminal 100 may be adjusted, so that the CPU works below certain working frequency, and/or the amplitude of the working frequency increased every time is controlled within a certain range. In the case that the CPU is a multi-core CPU, when a plurality of CPU cores simultaneously work, instantaneous heavy current is always generated in the terminal 100, so in this technical solution, when the electric quantity of the battery of the terminal 100 is low or at a specific electric quantity interval, at least one CPU core in the multi-core CPU may be disabled according to a predetermined rule (e.g. each CPU core in the multi-core CPU is numbered, then when the electric quantity of the battery of the terminal 100 is at a certain electric quantity interval, the CPU core of the minimum number is disabled, and when the electric quantity of the battery of the terminal 100 is further reduced, the CPU core of the minimum number in the working CPU cores is disabled according to the number sequence, and so on), or the working frequency of each CPU core in the CPU is adjusted, so that each CPU core works below certain working frequency, and/or the amplitude of the working frequency, increased every time, of each CPU core is controlled within a certain range, so as to reduce the power consumption of the multi-core CPU and avoid generating the instantaneous heavy current in the terminal 100.

When the GPU in the terminal 100 works at high frequency and the 3D hardware acceleration function is enabled, instantaneous heavy current may be generated in the terminal 100, so in this technical solution, when the electric quantity of the battery of the terminal 100 is low or at a specific electric quantity interval, the working frequency of the GPU in the terminal 100 may be adjusted, so that the GPU works below certain working frequency, and/or the 3D hardware acceleration function of the GPU is disabled, so as to reduce the power consumption of the GPU and avoid generating the instantaneous heavy current in the terminal 100.

After the data traffic of the service performed by the communication module in the terminal 100 reaches a certain degree, instantaneous heavy current may also be generated in the terminal 100, so in this technical solution, when the electric quantity of the battery of the terminal 100 is low or at a specific electric quantity interval, the data traffic of the communication module in the terminal 100 is limited within a preset range. Taking the LTE module as an example, services capable of being performed by the LTE module may be previously sequenced according to the magnitude of the data traffic; when the electric quantity of the battery of the terminal 100 is low or at a certain electric quantity interval, the LTE module is forbidden to perform the service with maximum data traffic; and when the electric quantity of the battery of the terminal 100 is further reduced, the LTE module is further forbidden to perform the current permissible service with maximum data traffic, and so on, so as to reduce the power consumption of the LTE module and avoid generating the instantaneous heavy current in the terminal 100. Or, for each communication module in the terminal 100, a data traffic threshold corresponding to each preset electric quantity interval is preset, and the corresponding data traffic threshold is selected according to the preset electric quantity interval of the real-time electric quantity of the battery, so that the services lower than the data traffic threshold are permitted, and the services greater than or equal to the data traffic threshold are disabled or in a waiting queue.

In the above technical solution, preferably, the terminal 100 further includes a setting unit 108 for performing association setting on at least one state adjustment scheme and at least one preset electric quantity interval according to a received setting command.

In this technical solution, different preset electric quantity intervals in which the electric quantity of the battery of the terminal 100 may meet requirements may be previously and respectively calculated for various conditions that different working components in the terminal 100 simultaneously work, and then different terminal state adjustment schemes are designed for these different conditions. These terminal state adjustment schemes may be previously associated with the different preset electric quantity intervals by default, and the different terminal state adjustment schemes may also be associated with the different preset electric quantity intervals by users according to their operating habits to meet different requirements of different users.

In the above technical solution, preferably, the preset electric quantity value and the preset electric quantity interval are calculated according to the minimum safe working voltage value of each working component, the consumed current value and the resistance value of the battery in the terminal 100. Wherein, "the consumed current value" indicates the corresponding consumed current value in the case that the working component is normal or in the case that the state adjustment scheme is adopted for adjusting when the corresponding state adjustment scheme exists.

In the above technical solution, preferably, the working components include the CPU, the GPU and/or the communication module in the terminal 100.

It could be known by calculating and analyzing that the CPU, the GPU and the communication module consume relatively high power in the current working components of the terminal 100. Therefore, in this technical solution, a specific state adjustment scheme may be made for one or more of the three working components, to reduce the power consumption thereof and ensure the working performance and stability of the terminal 100. Of course, those skilled in the art could understand that, obviously, the working states of other components in the terminal 100 may also be randomly adjusted by adopting the technical solutions of the present application.

In the above technical solution, preferably, the terminal 100 further includes a terminal state detection unit 110 for detecting whether the terminal 100 is in a charged state and a running state control unit 112 for enabling the terminal 100 to run in a specific state in the case that the terminal 100 is in the charged state.

In this technical solution, when the terminal 100 is in the charged state, no matter in which electric quantity interval the electric quantity of the battery of the terminal 100 is, the practical working voltage of each working component in the terminal 100 is prevented from being lower than the safe working voltage due to the instantaneous heavy current in the circuit, so under such a condition, each working component of the terminal 100 may be in any working state meeting the performance requirement of the terminal 100. The specific state may be a terminal working state selected by a user in a certain terminal state adjustment scheme, or a working state of the terminal 100 before charging, or a state of the terminal 100 when the electric quantity of the battery is not lower than the preset electric quantity value.

FIG. 2A to FIG. 2E show a flow diagram of an adjustment method for the working state of a terminal according to an embodiment of the present invention.

Figure 2A:
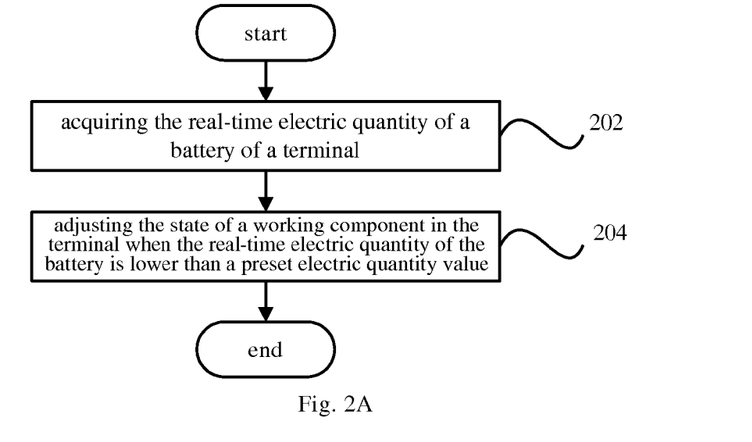
FIG. 2A to FIG. 2E show a flow diagram of an adjustment method for the working state of a terminal according to an embodiment of the present invention.

As shown in FIG. 2A, the adjustment method for the working state of the terminal according to the embodiment of the present invention includes: step 202, acquiring the real-time electric quantity of a battery of the terminal; and step 204, adjusting the state of a working component in the terminal when the real-time electric quantity of the battery is lower than a preset electric quantity value to limit the power consumption of the working component.

In this technical solution, the preset electric quantity value may be a pre-calculated minimum electric quantity value which needs to be maintained by the battery of the terminal when all working components in the terminal simultaneously work at full load, of course, may also be set by a user or a manufacturer according to actual conditions or needs. This electric quantity value may be calculated according to the minimum safe working voltage of each working component of the terminal, the maximum value of current consumed when all the working components of the terminal simultaneously work at full load and the internal resistance value of the battery of the terminal. When the real-time electric quantity of the battery of the terminal is smaller than the preset electric quantity value, it indicates that the battery of the terminal may not support all the working components in the terminal to simultaneously work at full load, and then state adjustment is needed for the working components in the terminal to limit the power consumption of these working components, so as to ensure that the voltage provided by the battery of the terminal meets the requirement of the working components at work in the terminal for safe working all the time and then prevent the phenomena of restart, crash and the like of the terminal due to abnormal power-down when the battery voltage is lower than the safe working voltage of a certain working component at work.

Figure 2B:
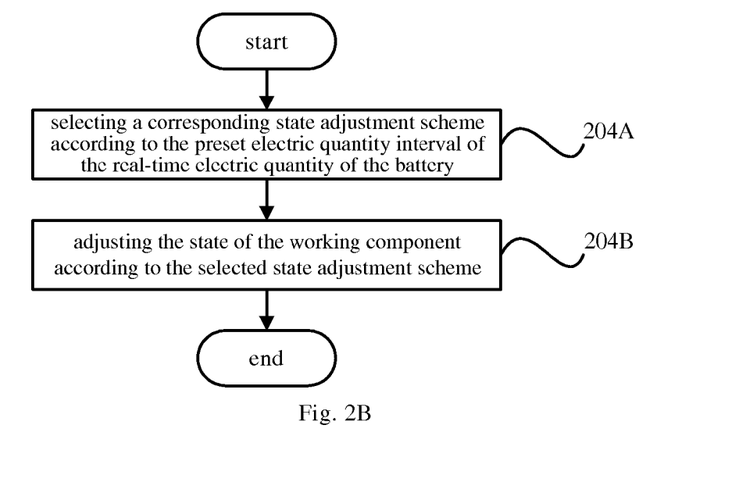

In the above technical solution, preferably, as shown in FIG. 2B, step 204 further includes: step 204A, selecting a corresponding state adjustment scheme according to the preset electric quantity interval of the real-time electric quantity of the battery; and step 204B, adjusting the state of the working component according to the selected state adjustment scheme.

In this technical solution, the power consumption of each working component in the terminal during working is different, the power consumption of a single working component in different working states is also different, thus, the electric quantity of the battery of the terminal may be respectively calculated in advance for various conditions that different working components simultaneously work, and then different terminal state adjustment schemes are designed for these different conditions, so that the working performance of the terminal is taken into account while the working stability of the terminal is ensured, and when the electric quantity of the battery of the terminal is in any preset electric quantity interval, the electric quantity of the battery may be fully utilized, abnormal power-down is avoided, and the user experience is improved.

In the above technical solution, preferably, each state adjustment scheme includes at least one of or a combination of the following items: adjusting the working frequency of a central processing unit (CPU) and/or the variation amplitude of the working frequency; if the CPU is a multi-core CPU, disabling at least one CPU core in the multi-core CPU according to a preset rule; adjusting the working frequency of a graphic processing unit (GPU) in the terminal and/or disabling a 3D hardware acceleration function; adjusting the working frequency of each CPU core in the CPU and/or the variation amplitude of the working frequency; and limiting the data traffic of a communication module in the terminal within a preset range.

Specifically, a detailed description is given below in combination with FIG. 2C to FIG. 2E.

Figure 2C:
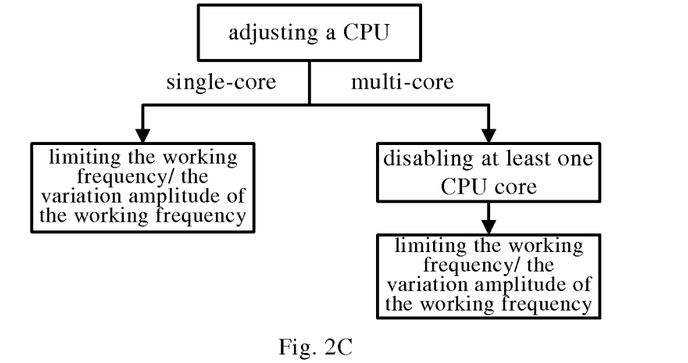

As shown in FIG. 2C, in the terminal, the CPU is a core component, and is also one of main power consumption components in the terminal. When the CPU works at high frequency or the working frequency of the CPU is greatly increased within short time, instantaneous heavy current may be generated in the terminal to cause abnormal power-down of the terminal. Therefore, in this technical solution, when the electric quantity of the battery of the terminal is low or at a specific electric quantity interval, for a single-core CPU, the working frequency of the CPU of the terminal may be directly adjusted, so that the CPU works below certain working frequency, and/or the amplitude of the working frequency increased every time is controlled within a certain range. In the case that the CPU is a multi-core CPU, when a plurality of CPU cores simultaneously work, instantaneous heavy current is always generated in the terminal, so in this technical solution, when the electric quantity of the battery of the terminal is low or at a specific electric quantity interval, at least one CPU core in the multi-core CPU may be disabled according to a predetermined rule (e.g. each CPU core in the multi-core CPU is numbered, then when the electric quantity of the battery of the terminal is at a certain electric quantity interval, the CPU core of the minimum number is disabled, and when the electric quantity of the battery of the terminal is further reduced, the CPU core of the minimum number in the working CPU cores is disabled according to the number sequence, and so on), or the working frequency of each CPU core in the CPU is adjusted, so that each CPU core works below certain working frequency, and/or the amplitude of the working frequency, increased every time, of each CPU core is controlled within a certain range, so as to reduce the power consumption of the multi-core CPU and avoid generating the instantaneous heavy current in the terminal. Of course, "disabling the CPU core" and "limiting the working frequency of each CPU core and the like" may be performed simultaneously or separately, and the sequence may be randomly set as required.

Figure 2D:
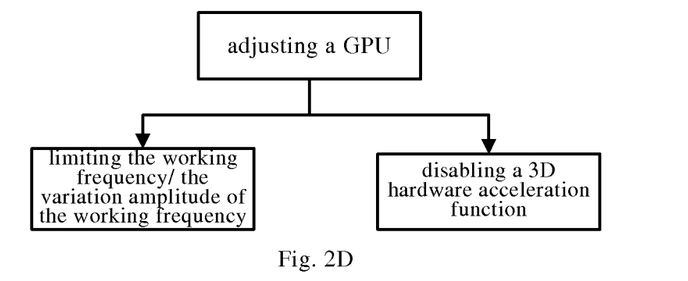

As shown in FIG. 2D, when the GPU in the terminal works at high frequency and the 3D hardware acceleration function is enabled, instantaneous heavy current may be generated in the terminal, so in this technical solution, when the electric quantity of the battery of the terminal is low or at a specific electric quantity interval, the working frequency of the GPU in the terminal may be adjusted, so that the GPU works below certain working frequency, and/or the 3D hardware acceleration function of the GPU is disabled, so as to reduce the power consumption of the GPU and avoid generating the instantaneous heavy current in the terminal.

Figure 2E:
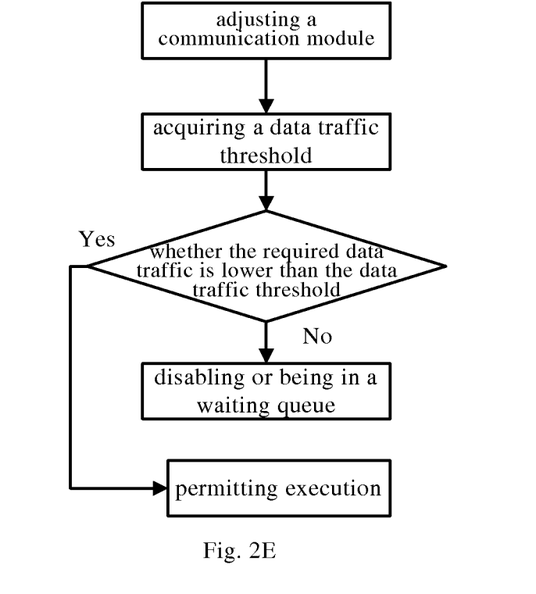

As shown in FIG. 2E, after the data traffic of the service performed by the communication module in the terminal reaches a certain degree, instantaneous heavy current may also be generated in the terminal, so in this technical solution, when the electric quantity of the battery of the terminal is low or at a specific electric quantity interval, the data traffic of the communication module in the terminal is limited within a preset range. Specifically, for each communication module in the terminal, a data traffic threshold corresponding to each preset electric quantity interval is preset, and the corresponding data traffic threshold is selected according to the preset electric quantity interval of the real-time electric quantity of the battery, so that the services lower than the data traffic threshold are permitted, and the services greater than or equal to the data traffic threshold are disabled or in a waiting queue. Or other technical solutions are adopted, e.g. taking the LTE module as an example, services capable of being performed by the LTE module may be previously sequenced according to the magnitude of the data traffic; when the electric quantity of the battery of the terminal is low or at a certain electric quantity interval, the LTE module is forbidden to perform the service with maximum data traffic; and when the electric quantity of the battery of the terminal is further reduced, the LTE module is further forbidden to perform the current permissible service with maximum data traffic, and so on, so as to reduce the power consumption of the LTE module and avoid generating the instantaneous heavy current in the terminal.

In the above technical solution, preferably, before step 204, the adjustment method further includes: performing association setting on at least one state adjustment scheme and at least one preset electric quantity interval according to a received setting command.

In this technical solution, different preset electric quantity intervals in which the electric quantity of the battery of the terminal may meet requirements may be previously and respectively calculated for various conditions that different working components in the terminal simultaneously work, and then different terminal state adjustment schemes are designed for these different conditions. These terminal state adjustment schemes may be previously associated with the different preset electric quantity intervals by default, and the different terminal state adjustment schemes may also be associated with the different preset electric quantity intervals by users according to their operating habits to meet different requirements of different users.

In the above technical solution, preferably, in step 204, the preset electric quantity value and the preset electric quantity interval are calculated according to the minimum safe working voltage value of each working component, the consumed current value and the resistance value of the battery in the terminal. Wherein, "the consumed current value" indicates the corresponding consumed current value in the case that the working component is normal or in the case that the state adjustment scheme is adopted for adjusting when the corresponding state adjustment scheme exists.

In the above technical solution, preferably, the working components include the CPU, the GPU and/or the communication module in the terminal.

It could be known by calculating and analyzing that the CPU, the GPU and the communication module consume relatively high power in the current working components of the terminal. Therefore, in this technical solution, a specific state adjustment scheme may be made for one or more of the three working components, to reduce the power consumption thereof and ensure the working performance and stability of the terminal. Of course, those skilled in the art could understand that, obviously, the working states of other components in the terminal may also be randomly adjusted by adopting the technical solutions of the present application.

In the above technical solution, preferably, step 204 further includes: enabling the terminal to run in a specific state if the terminal is in a charged state.

In this technical solution, when the terminal is in the charged state, no matter in which electric quantity interval the electric quantity of the battery of the terminal is, the practical working voltage of each working component in the terminal is prevented from being lower than the safe working voltage due to the instantaneous heavy current in the circuit, so under such a condition, each working component of the terminal may be in any working state meeting the performance requirement of the terminal. The specific state may be a terminal working state selected by a user in a certain terminal state adjustment scheme, or a working state of the terminal before charging, or a state of the terminal when the electric quantity of the battery is not lower than the preset electric quantity value.

Figure 3:
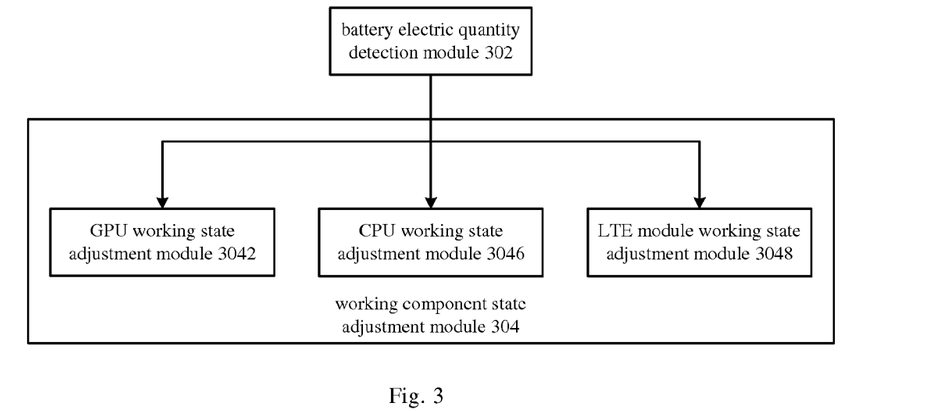
FIG. 3 shows a schematic diagram of an implementation framework of main modules of a terminal according to an embodiment of the present invention.

FIG. 3 shows a schematic diagram of an implementation framework of main modules of a terminal according to an embodiment of the present invention.

As shown in FIG. 3, the main modules of the terminal according to the embodiment of the present invention include a battery electric quantity detection module 302 and a working component state adjustment module 304.

The battery electric quantity detection module 302 is used for periodically querying the battery electric quantity and charged state of the terminal, and notifying the working component state adjustment module 304 to take corresponding measures when the electric quantity of the battery of the terminal is lower than the preset electric quantity value or a connection between the terminal and a charger is monitored, thus taking the performance and stability of the mobile phone into account.

The working component state adjustment module 304 may be subdivided into a GPU working state adjustment module 3042, a CPU working state adjustment module 3046 and an LTE module working state adjustment module 3048 according to the adjusted working components.

The GPU working state adjustment module 3042 is used for start and frequency adjustment of a GPU. After receiving the low electric quantity notification of the battery electric quantity detection module 302, the GPU working state adjustment module 3042 adjusts the working frequency of the GPU to be below certain frequency, and/or forbids the GPU to enable a 3D hardware acceleration function and the like; and when the electric quantity of the battery of the terminal is relatively high or the terminal is connected with the charger, the GPU working state adjustment module 3042 cancels the above limitation to the GPU.

The CPU working state adjustment module 3046 is used for: performing multi-core start of the CPU and dynamic adjustment of the working frequency according to the performance requirements of the terminal under the normal condition; making certain limitation to the working state of the CPU after receiving the low electric quantity notification of the battery electric quantity detection module 302, including disabling at least one CPU core in the CPU according to a predetermined rule (e.g. numbering each CPU core in the CPU, then when the electric quantity of the battery of the terminal is at a certain electric quantity interval, disabling the CPU core of the minimum number, and when the electric quantity of the battery of the terminal is further reduced, disabling the CPU core of the minimum number in the working CPU cores according to the number sequence, and so on), or adjusting the working frequency of each CPU core in the CPU, so that each CPU core works below certain working frequency, and/or controlling the amplitude of the working frequency, increased every time, of each CPU core within a certain range; and after receiving the notification that the electric quantity of the battery of the terminal is relatively high or the terminal is connected with the charger, canceling the above limitation to the CPU.

The LTE module working state adjustment module 3048 is used for managing the working state of the LTE module. Since the power consumption produced when the LTE module carries out a service of large data traffic is very high, it is necessary to make some limitation to the LTE module when the electric quantity of the battery of the terminal is low, so as to ensure that the terminal may work normally, e.g. services capable of being performed by the LTE module may be previously sequenced according to the magnitude of the data traffic; after the low electric quantity notification of the battery electric quantity detection module 302 is received, the LTE module is forbidden to perform the service with maximum data traffic; and when the electric quantity of the battery of the terminal is further reduced, the LTE module is further forbidden to perform the current permissible service with maximum data traffic, and so on; and after the notification that the electric quantity of the battery of the terminal is relatively high or the terminal is connected with the charger is received, the above limitation to the LTE module is canceled.

Figure 4:
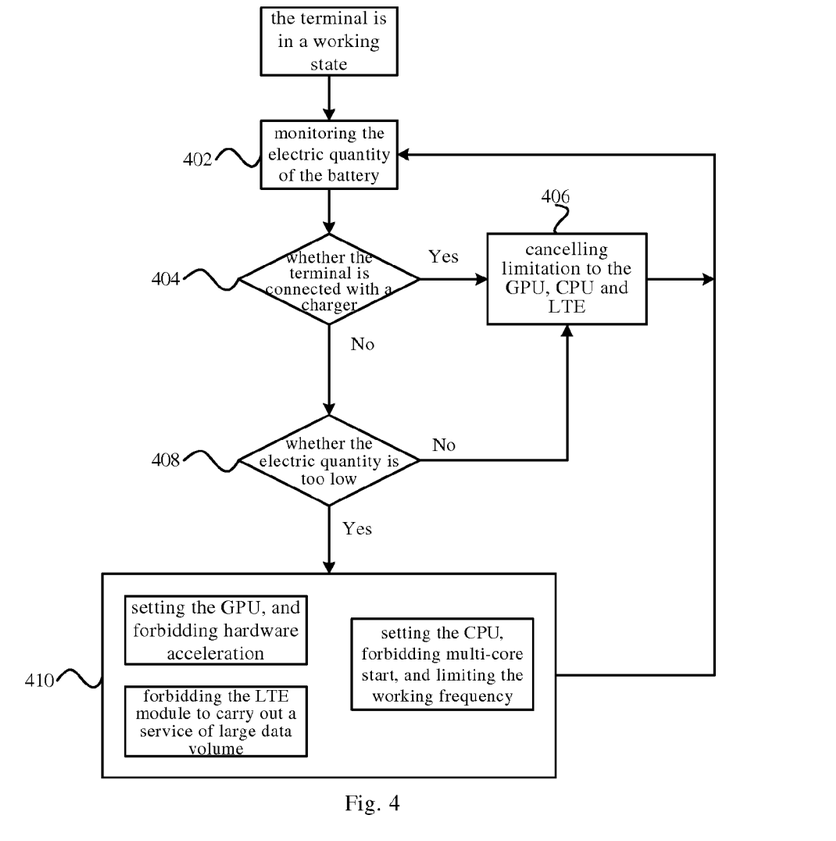
FIG. 4 shows a schematic diagram of an operating flow of a terminal according to an embodiment of the present invention.

FIG. 4 shows a schematic diagram of an operating flow of a terminal according to an embodiment of the present invention.

As shown in FIG. 4, the operating flow of the terminal according to the embodiment of the present invention is as follows:

step 402, monitoring the electric quantity of a battery of the terminal;

step 404, checking whether the terminal is connected with a charger; if so, entering step 406; otherwise, entering step 408;

step 406, canceling the limitation to the GPU, CPU and LTE of the terminal;

step 408, judging whether the electric quantity of the battery of the terminal is too low; if not, entering step 406; if so, entering step 410;

step 410, respectively setting the CPU, GPU and LTE modules according to the electric quantity value interval of the electric quantity of the battery of the terminal, so as to reduce the power consumption of the modules. Wherein, under a preferred condition, the relation between the electric quantity of the battery of the terminal and the working state of the terminal may be as shown in table 1 below:

TABLE 1

| Electric Quantity of Battery | Working State of Terminal |
| --- | --- |
| lower than $C_1$ | forbidding all cores of the CPU to be simultaneously started, and permitting any single core in the CPU to work at highest frequency |
| lower than $C_2$ | forbidding all cores of the CPU to be simultaneously started, forbidding the GPU to enable a 3D hardware acceleration function, and permitting any single core in the CPU to work at highest frequency |
| lower than $C_3$ | forbidding all cores of the CPU to be simultaneously started, forbidding the GPU to enable a 3D hardware acceleration function, limiting the highest working frequency of any single core of the CPU to be f, meanwhile, gradually raising the CPU frequency in a conservative CPU frequency adjustment manner, thus avoiding instantaneous power drop caused by sudden change of the CPU frequency |
| lower than $C_4$ | forbidding all cores of the CPU to be simultaneously started, forbidding the GPU to enable a 3D hardware acceleration function, limiting the highest working frequency of any single core of the CPU to be f, limiting the LTE module to carry out a service of large data traffic, and permitting low-speed services such as VOLTE (voice call based on LTE network) |

TABLE 1-continued

| Electric Quantity of Battery | Working State of Terminal |
|---|---|
| higher than $C_1$ or connected with a charger | gradually canceling the limitation according to the above levels |

In table 1, $C_1>C_2>C_3>C_4$. When the electric quantity of the battery is very low, the working current of the terminal is reduced by reducing the working frequency of the CPU and limiting the functions of the GPU and LTE modules, so that the problem of abnormal power-down of the terminal under the condition of low power is solved. The values of $C_1$, $C_2$, $C_3$ and $C_4$ are calculated according to the safe working voltage of hardware of the terminal, the maximum current consumed by the terminal in the ultimate working state of each stage and the internal resistance of the battery. Of course, those skilled in the art could understand that, besides the manners disclosed in table 1, obviously, any working component in the terminal may be selected in the technical solutions of the present application and processed in an appropriate manner to limit the power consumption thereof, so that insufficient power supply to the terminal due to instantaneous heavy current is avoided.

The technical solutions of the present invention are described in detail above in combination with the accompanying drawings. Through the technical solutions of the present invention, the working state of the terminal may be adjusted according to the real-time electric quantity of the battery of the terminal, so that the problem that the battery output voltage of the terminal suddenly decreases below the safe working voltage of hardware thereof due to instantaneous heavy current in the circuit of the terminal in the case that the electric quantity of the battery is relatively low is solved, the operating stability of the terminal is ensured while taking the performance of the terminal into account, and the user experience is improved.

The foregoing descriptions are merely preferred embodiments of the present invention, rather than limiting the present invention. Various modifications and alterations may be made for those skilled in the art. Any modification, equivalent substitution, improvement or the like made within the spirit and principle of the present invention shall fall into the protection scope of the present invention.

The invention claimed is:

1. A terminal, comprising:
a storage device for storing a correspondence table having a plurality of preset electric quantity intervals and a plurality of selectable state adjustment schemes, respectively associated with each other, each of the plurality of preset electric quantity intervals is calculated based on the minimum safe working voltage value of each working component, a consumed current value for a working state for the corresponding selectable adjustment scheme and a resistance value of a battery of the terminal;
an electric quantity acquisition unit for acquiring the real-time electric quantity of the battery of the terminal;
an interval judgment unit for comparing the real-time electric quantity with the plurality of preset electric quantity intervals; and
a state adjustment unit for adjusting the state of a working component in the terminal by using the selectable state adjustment scheme that is associated with one of the plurality of preset electric quantity intervals based on the comparing, each selectable state adjustment scheme including disabling at least one CPU core in a multi-core CPU according to a preset rule.

2. The terminal of claim 1, wherein each selectable state adjustment scheme further comprises at least one of or a combination of the following items:
adjusting the working frequency of a central processing unit (CPU) and/or the variation amplitude of the working frequency;
adjusting the working frequency of each CPU core in the multi-core CPU and/or the variation amplitude of the working frequency;
adjusting the working frequency of a graphic processing unit (GPU) in the terminal and/or disabling a 3D hardware acceleration function; and
limiting the data traffic of a communication module in the terminal within a preset range.

3. The terminal of claim 2, further comprising:
a setting unit for creating the association for each of the corresponding state adjustment schemes and a respective one of the plurality of preset electric quantity intervals according to a received setting command.

4. The terminal of claim 3, further comprising:
a terminal state detection unit for detecting whether the terminal is in a charged state; and
a running state control unit for enabling the terminal to run in a specific state in the case that the terminal is in the charged state.

5. The terminal of claim 2, further comprising:
a terminal state detection unit for detecting whether the terminal is in a charged state; and
a running state control unit for enabling the terminal to run in a specific state in the case that the terminal is in the charged state.

6. The terminal of claim 1, wherein the working components comprise:
the CPU, the GPU and/or the communication module in the terminal.

7. The terminal of claim 1, further comprising:
a terminal state detection unit for detecting whether the terminal is in a charged state; and
a running state control unit for enabling the terminal to run in a specific state in the case that the terminal is in the charged state.

8. The terminal of claim 1, wherein the association for each of the corresponding state adjustment schemes and the respective one of the plurality of preset electric quantity intervals is varied, and wherein when the association is varied, the calculation of each of the preset electric quantity intervals is repeated.

9. An adjustment method for the working state of a terminal having a multi-core CPU, comprising:
acquiring a real-time electric quantity of a battery of the terminal;
comparing the real-time electric quantity with a plurality of preset electric quantity intervals which are stored, each of the plurality of preset electric quantity intervals is associated with a respective selectable state adjustment scheme and each of the plurality of preset electric quantity intervals is calculated based on the minimum safe working voltage value of each working component, a consumed current value for a working state for the corresponding selectable adjustment scheme and a resistance value of the battery of the terminal,
selecting a corresponding state adjustment scheme to adjust the state of a working component according the comparing; and adjusting a state of a working component in the terminal using the selected corresponding state adjustment scheme, each of the respective selectable state adjustment schemes including disabling at least one CPU core in the multi-core CPU according to a preset rule.

10. The adjustment method for the working state of a terminal of claim 9, wherein each respective state adjustment scheme further comprises at least one of or a combination of the following items:
adjusting the working frequency of a central processing unit (CPU) and/or the variation amplitude of the working frequency;
adjusting the working frequency of a graphic processing unit (GPU) in the terminal and/or disabling a 3D hardware acceleration function;
adjusting the working frequency of each CPU core in the multi-core CPU and/or the variation amplitude of the working frequency; and
limiting the data traffic of a communication module in the terminal within a preset range.

11. The adjustment method for the working state of a terminal of claim 10, further comprises:
associating, each of the plurality of respective state adjustment schemes with a respective one of the plurality of preset electric quantity intervals according to a received setting command.

12. The adjustment method for the working state of a terminal of claim 9, further comprising:
enabling the terminal to run in a specific state if the terminal is in a charged state.

13. The adjustment method for the working state of a terminal of claim 9, wherein the association for each of the corresponding state adjustment schemes and the respective one of the plurality of preset electric quantity intervals is varied, and wherein when the association is varied, the calculation of each of the preset electric quantity intervals is repeated.

* * * * *